United States Patent
Mahler et al.

(10) Patent No.: US 8,843,891 B2
(45) Date of Patent: Sep. 23, 2014

(54) CUSTOM CODE MANAGEMENT

(75) Inventors: Juergen Mahler, Malsch (DE);
Mahadevan Venkata, Mannheim (DE);
Bjoern Panter, Saabruecken (DE)

(73) Assignee: SAP AG, Walldorf (DE)

( * ) Notice: Subject to any disclaimer, the term of this patent is extended or adjusted under 35 U.S.C. 154(b) by 36 days.

(21) Appl. No.: 13/530,853

(22) Filed: Jun. 22, 2012

(65) Prior Publication Data
US 2013/0346944 A1    Dec. 26, 2013

(51) Int. Cl.
*G06F 9/44* (2006.01)

(52) U.S. Cl.
USPC ........................................... 717/120

(58) Field of Classification Search
None
See application file for complete search history.

(56) References Cited

U.S. PATENT DOCUMENTS

| | | | |
|---|---|---|---|
| 5,745,879 A * | 4/1998 | Wyman ........................ | 705/1.1 |
| 7,421,715 B1 * | 9/2008 | Margulis et al. ............. | 719/331 |
| 8,336,043 B2 * | 12/2012 | Lavery et al. ................. | 717/173 |
| 8,375,460 B2 * | 2/2013 | Liang et al. .................... | 726/30 |
| 2003/0066063 A1 * | 4/2003 | Yokota ........................... | 717/173 |
| 2005/0066198 A1 * | 3/2005 | Gelme et al. .................. | 713/201 |
| 2008/0201568 A1 * | 8/2008 | Quinn et al. .................... | 713/1 |
| 2009/0038018 A1 * | 2/2009 | Mikami ......................... | 726/27 |
| 2009/0292864 A1 * | 11/2009 | Mori .............................. | 711/103 |
| 2010/0275252 A1 * | 10/2010 | Yun .................................. | 726/7 |
| 2011/0246444 A1 * | 10/2011 | Jenkins et al. ................ | 707/711 |
| 2012/0185521 A1 * | 7/2012 | Giampaolo et al. .......... | 707/831 |
| 2012/0185827 A1 * | 7/2012 | Eska et al. ..................... | 717/121 |
| 2013/0055235 A1 * | 2/2013 | Eska et al. ..................... | 717/173 |

* cited by examiner

*Primary Examiner* — Don Wong
*Assistant Examiner* — Hossain Morshed
(74) *Attorney, Agent, or Firm* — Schwegman Lundberg & Woessner, P.A.

(57) ABSTRACT

A system, method and computer readable medium to remotely control performance of a method including detecting an identifier of an object requested to run on a computer system via a kernel running on the computer system, comparing the identifier with a list of identifiers of custom created code objects, and taking an action as a function of whether or not the identifier of the requested object is on the list of identifiers of custom created code objects.

14 Claims, 4 Drawing Sheets

CUSTOM CODE MANAGEMENT

BACKGROUND

Many software products allow customers to create their own custom code. SAP's ABAP Workbench features, for example, facilitate the creation of custom code by customers. Once the custom code is written, usually in the form of objects, the objects remain in the software system for the life of the system, unless manually removed.

Custom code objects can lead to high maintenance and operations costs, and can also lead to unforeseen risks when it is executed. Updates, maintenance actions, and upgrades to the software products may result in unpredictable interactions with custom code objects if they are run. Resulting incidents may require additional management and handling expenses.

SUMMARY

A system, method and computer readable medium remotely manage a method including detecting an identifier of an object requested to run on a computer system via a kernel running on the computer system, comparing the identifier with a list of identifiers of custom created code objects, and taking an action as a function of whether or not the identifier of the requested object is on the list of identifiers of custom created code objects.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software or a combination of software and human implemented procedures in one embodiment. The software may consist of computer executable instructions stored on computer readable media such as memory or other type of storage devices. Further, such functions correspond to modules, which are software stored on storage devices, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system.

Figure 1:
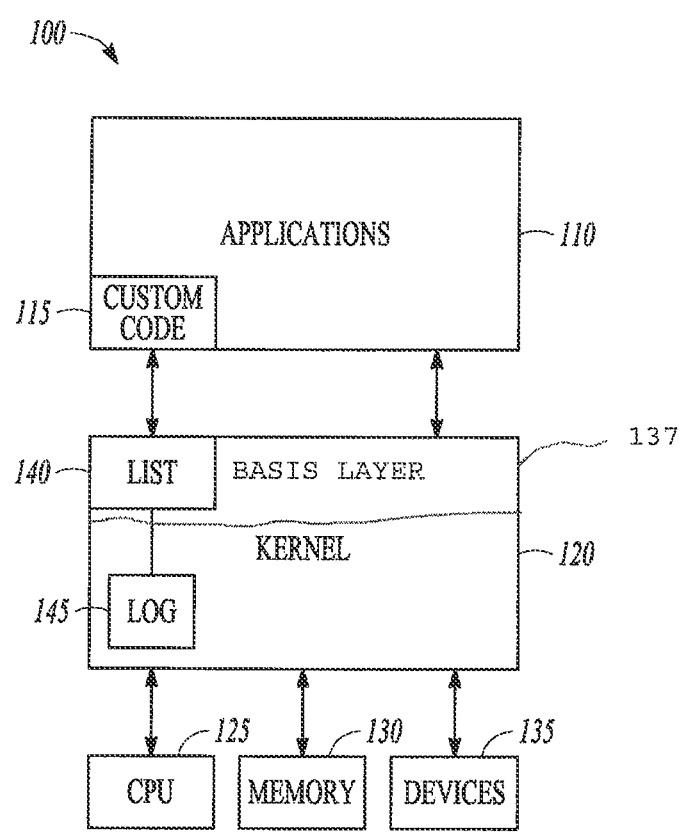
FIG. 1 is a block diagram of a system for managing custom code according to an example embodiment.

FIG. 1 is a block diagram of a system 100 for managing custom code according to an example embodiment. The system 100 has applications 110 stored on one or more computer readable storage devices that implement a software product. A software product maybe written and licensed by a third party. Customers may create custom code objects 115 that may use one or more user exits or other interfaces to the software product to accomplish specialized functions that may be needed by a customer running or otherwise using the software product. In some embodiments, the software product may run on a server operated by the third party or other entity, or may be run on customer owned systems. The custom code objects 115 may also run on the same system in some embodiments.

The applications 110 and custom code 115 sit on top of an operating system kernel 120 that serves as an interface between software and hardware resources, such as central processing unit (CPU) 125, memory 130, and other hardware based devices 135. The kernel 120 may be thought of as a lowest level of programming that directly controls the hardware. A basis layer 137 resides on top of the kernel 120, and provides translation services between applications 110 and the kernel 120. The basis layer translates the low level code of the kernel that runs on the hardware into an interface that can communicate with the applications 110 and receive actions from the applications and translate them into kernel level instructions that run on the hardware. The hardware resources are made available via the kernel 120 and basis layer 137 to the applications 110 and custom code 115 via inter process communication mechanisms and system calls in some embodiments.

A list 140 of custom code objects is maintained, and available to the kernel. The list may be compiled manually by a customer as custom code objects are created, or may be generated by noting when non-application objects makes calls to the kernel to operate, provided each object provides a unique identifier when making the call. Once the list is available, the kernel is able to provide information identifying each time a custom code object is run. The information identifies at least the object, and the time that it was run. The information may be recorded in a database, or in a log 145. Note that the list and log are indicated as in the kernel 120, but in reality, they, and the kernel, applications, and custom code are all stored on one or more computer readable storage devices, and may be accessed by one or more programs on system 100, including the basis layer 137.

Code in the kernel 120 may reference the list 140 and lot 145, which may be stored separately from the kernel and are not part of the kernel itself. They are simply illustrated in FIG. 1 in a manner to identify a logical relationship between the stored code and information. In one embodiment, each custom code object is differentiated from system objects under control of a system vendor via a naming convention. Custom code objects created by or for customers are created in a specific namespace, such as: customer namespace/0CUST/. All customers create objects or their custom developments under this namespace. The names of these customer objects typically start with the alphabet Y or Z. For example, a customer program may be 'z_find_credit_history' or 'y_perform_upstream_functions' . . . etc. In one embodiment, searching for a customer object may be done by querying a table listing all objects for object names beginning with Y* or Z*.

As a custom code object is called, the kernel, in one embodiment, notes the name of the object as indicative of a custom code object and collects information about the object, such as object name, object type, when executed, by which user, owner, and other information associated with the object. This information is sent back to the basis layer 137, which then compiles the list 140. In some embodiments, the list may be generated by an application. In some customer systems, there may be several thousand objects. Utilizing the kernel 120 to perform this recognition saves the customer from having to insert special code into each custom code object to generate the information at a higher software level, such via a separate application.

During an upgrade, the customer may have to test a large number of custom code objects. By searching through the list to identify and decommission objects that have not been recently executed, a large number of these objects can be identified for decommissioning, greatly reducing the number of objects that need to be tested and potentially modified as a result of the upgrade.

Figure 2:
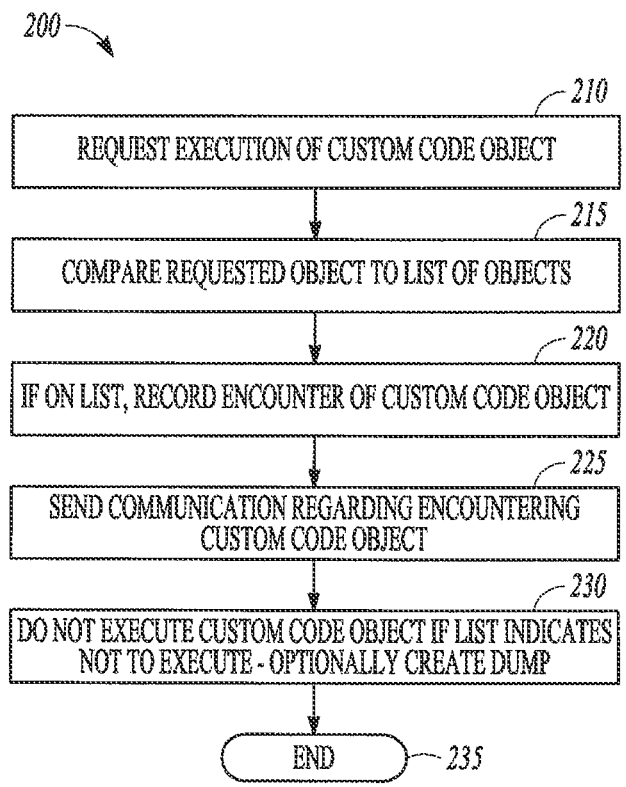
FIG. 2 is a flowchart illustrating a method of managing custom code according to an example embodiment.

FIG. 2 is a flowchart illustrating a method 200 of managing custom code according to an example embodiment. A custom code object may be an object or other type of program that is customized by a customer and executed to perform functions that the software system may not be designed to provide, or at least not as the customer desires the function to be performed. The custom code objects may be written to perform a one-time function for a special project the customer is performing. As such, it may only be run or executed once. Other custom code objects may be run periodically, such as daily, weekly, monthly, quarterly, or yearly. Typical custom code objects include special reports to be run against a relational database of business information, but may also be written to perform many other different types of functions.

Each time a custom code object is requested to be executed, the kernel, as indicated at 210 encounters the object, such as via a system call or other mechanism and generates information identifying the object as a custom code object. At 215, the generated information is compared to the list of objects to determine whether the custom code is in the list. The comparison may be performed via the basis layer, or an application in various embodiments. If it is in the list, it is recorded at 220 that the custom code object has been encountered, noting the time and date of the encounter. The kernel or basis layer may also send a communication at 225 to an operator or user of the system 100 that the custom code object has been encountered. The list may also be used to indicate that the custom code object should not be executed. When this is determined at 230, the kernel may create a short dump, show an information/warning message, send an email notification and not allow execution of the custom code object. The method then ends at 235.

If at 215, the kernel finds that the object is not on the custom code object list, processing continues at 240, and the object is executed. Such objects may include application objects that are part of the software program, and may also include custom code objects that are not selected to be part of the list 140. Following execution of the object, the method ends at 235. The method may be performed each time an object is encountered for execution.

Figure 3:
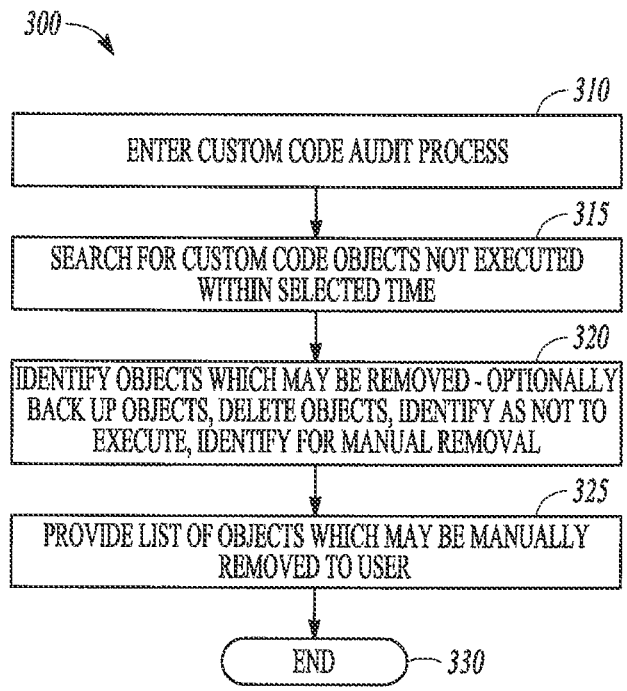
FIG. 3 is a flowchart illustrating a method of identifying custom code for elimination according to an example embodiment.

A method 300 for auditing and removing selected custom code objects is illustrated in flowchart form in FIG. 3. The method may be incorporated in the basis layer or application layer and may be entered at 310, either at the instigation of a customer such as a user or administrator, or periodically according to a defined schedule. The method may also be accessed remotely by a service provider in further embodiments to enable remotely controlled auditing and removal of selected custom code objects.

The log or database is searched at 315 to determine which custom code objects have not been executed for a selected amount of time. The selected amount of time may be a period of time that is set by a user or administrator, or some default period. Typical periods may include three months or one year, or a little over one year. The period should be set to not delete Objects that the customer desires to run periodically. The period can vary significantly depending on customer desires.

At 320, identified objects may be removed from the system so that they are not executed. The objects may be backed up if desired in case the user may want to find them and reinstall them at a later point in time. The backup may allow the period at 315 to be less than one year or other period as desired, because the object is not irretrievably deleted. Instead of deletion, the object may simply be indicated as one which should not be executed, resulting in the dump at 230 the next time the system attempts to execute the object. In further embodiments, at 325, a list of objects which may be manually removed due to their not being attempted to be executed for the selected time period may be provided to the user or administrator. The user or administrator is then free to use the list to manually delete the identified objects. The process ends at 330.

In still further embodiments, criteria other than time since the last use of an object may be used to identify objects for deletion or identification not usable or may be deleted may be utilized. Such criteria may include number of uses within a selected time. Identification of users that have used the object, and whether such users or their positions still exist may be used. Many different criteria may be used in various embodiments.

Figure 4:
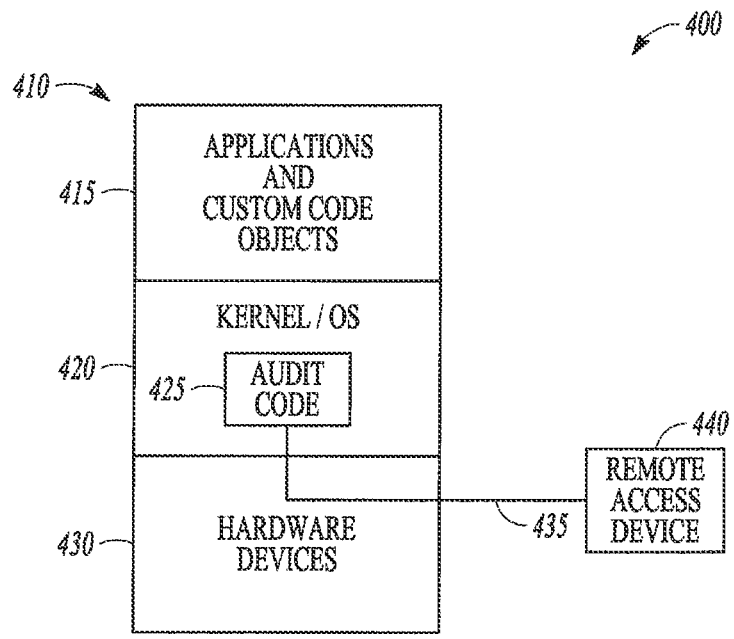
FIG. 4 is a block diagram illustrating remote operation of one or more methods according to an example embodiment.

FIG. 4 is a block diagram illustrating at system 400 that facilitates remote operation of one or more of the methods described above. A customer system 410 includes applications and custom code objects 415 to execute on top of an operating system and kernel 420, which may also include the basis layer in some embodiments. The operating system and kernel 420 contains audit code 425 for executing method 300, and may also contain code for detecting attempted execution of custom code objects as described in method 200. In further embodiments, code to execute methods 200 and 300 may be distributed between the kernel, operating system, middleware, and applications.

The kernel 425 provides a programming interface to hardware devices 430. As previously indicated, hardware devices 430 may contain processing hardware, memory, and other devices, such as communication devices including modems, network connectors and transceivers that may be utilized to couple via a network 435 to a remote access device 440. The remote access device 440 may be a computer type of device that may be used by a service provider to execute one or more of the methods 200 and 300 in some embodiments. Device 440 maybe a handheld mobile networked device, a laptop computer, a server coupled to user devices, or any other type of device or system that allows a user to interact with and cause remote execution of the audit code 425.

Figure 5:
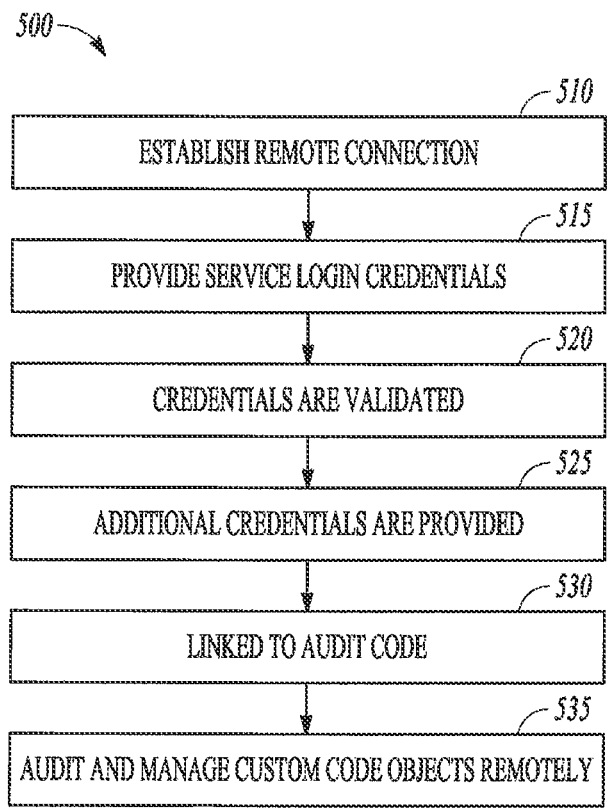
FIG. 5 is a flowchart illustrating a method of remotely managing custom code according to an example embodiment.

FIG. 5 is a method 500 illustrating remotely accessing the audit code. Method 500 begins at 510 by establishing a remote connection via device 440 to hardware devices 430. Service login credentials such as an ID and password are supplied at 515 and validated at 520. Additional credentials, including a further password or other security constructs may be needed in various embodiments to access the audit code remotely, and are supplied if needed at 525. The remote access device 440 is then provided a direct link into the audit code 425 at 530, allowing the auditing and management 535 of custom code objects in accordance with method 300. In further embodiments, various parameters, such as scheduling of audits and editing list 140 may be provided. Further parameters, including a length of time between attempted executions for indicating custom code may be flagged for deletion or non-execution may also be set.

Figure 6:
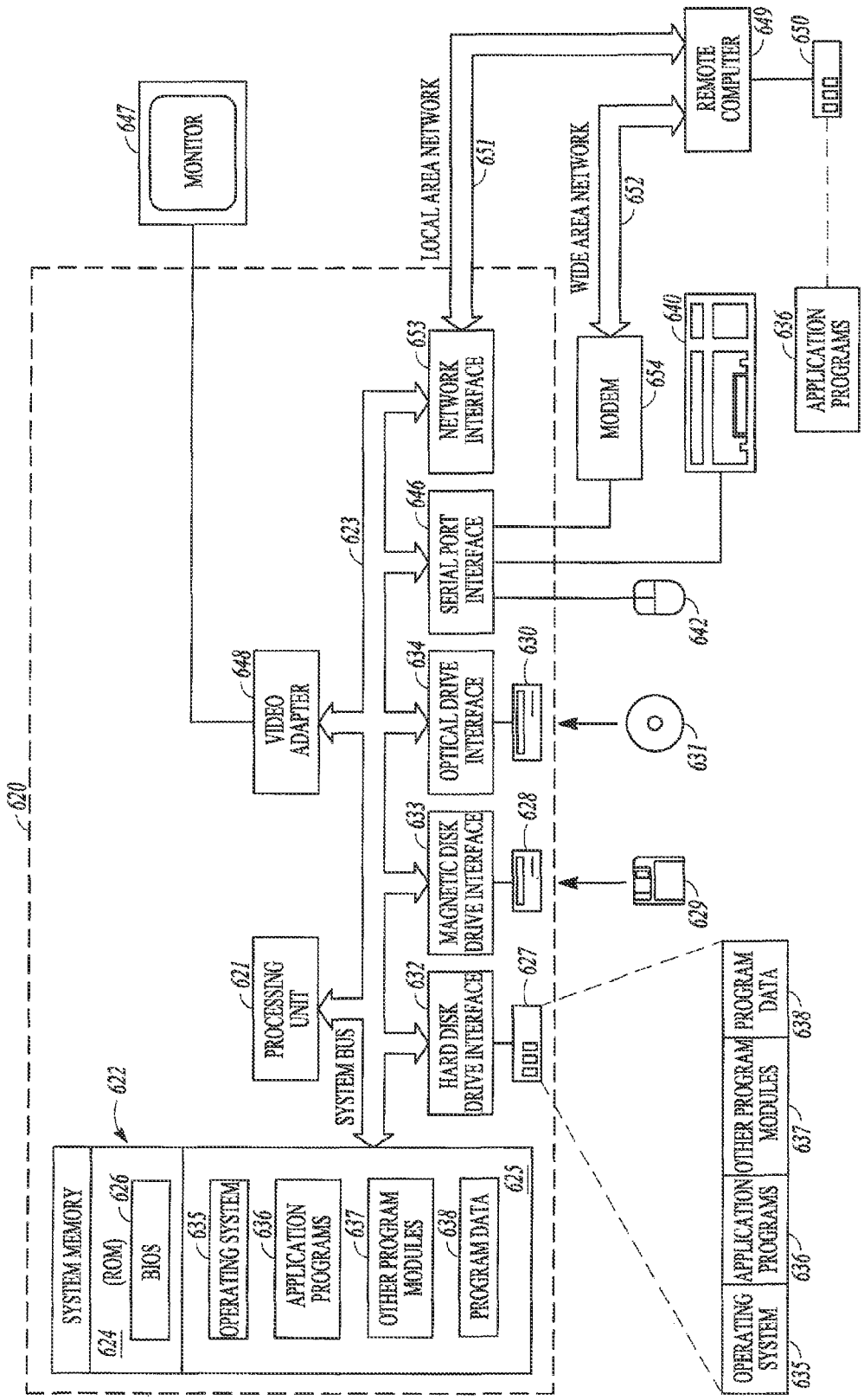
FIG. 6 is a block diagram of a computer system for implementing one or more methods according to an example embodiment.

FIG. 6 is a block diagram of a computer system to implement methods according to an example embodiment. In the embodiment shown in FIG. 6, a hardware and operating environment is provided that is applicable to any of the servers and/or remote clients shown in the other Figures.

As shown in FIG. 6, one embodiment of the hardware and operating environment includes a general purpose computing device in the form of a computer 620 (e.g., a personal computer, workstation, or server), including one or more processing units 621, a system memory 622, and a system bus 623 that operatively couples various system components including the system memory 622 to the processing unit 621. There may be only one or there may be more than one processing unit 621, such that the processor of computer 620 comprises a single central-processing unit (CPU), or a plurality of processing units, commonly referred to as a multiprocessor or parallel-processor environment. In various embodiments, computer 620 is a conventional computer, a distributed computer, or any other type of computer.

The system bus 623 can be any of several types of bus structures including a memory bus or memory controller, a peripheral bus, and a local bus using any of a variety of bus architectures. The system memory can also be referred to as simply the memory, and, in some embodiments, includes read-only memory (ROM) 624 and random-access memory (RAM) 625. A basic input/output system (BIOS) program 626, containing the basic routines that help to transfer information between elements within the computer 620, such as during start-up, may be stored in ROM 624. The computer 620 further includes a hard disk drive 627 for reading from and writing to a hard disk, not shown, a magnetic disk drive 628 for reading from or writing to a removable magnetic disk 629, and an optical disk drive 630 for reading from or writing to a removable optical disk 631 such as a CD ROM or other optical media.

The hard disk drive 627, magnetic disk drive 628, and optical disk drive 630 couple with a hard disk drive interface 632, a magnetic disk drive interface 633, and an optical disk drive interface 634, respectively. The drives and their associated computer-readable media provide non volatile storage of computer-readable instructions, data structures, program modules and other data for the computer 620. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), redundant arrays of independent disks (e.g., RAID storage devices) and the like, can be used in the exemplary operating environment.

A plurality of program modules can be stored on the hard disk, magnetic disk 629, optical disk 631, ROM 624, or RAM 625, including an operating system 635, one or more application programs 636, other program modules 637, and program data 638. Programming for implementing one or more processes or method described herein may be resident on any one or number of these computer-readable media.

A user may enter commands and information into computer 620 through input devices such as a keyboard 640 and pointing device 642. Other input devices (not shown) can include a microphone, joystick, game pad, satellite dish, scanner, or the like. These other input devices are often connected to the processing unit 621 through a serial port interface 646 that is coupled to the system bus 623, but can be connected by other interfaces, such as a parallel port, game port, or a universal serial bus (USB). A monitor 647 or Other type of display device can also be connected to the system bus 623 via an interface, such as a video adapter 648. The monitor 647 can display a graphical user interface for the user. In addition to the monitor 647, computers typically include other peripheral output devices (not shown), such as speakers and printers.

The computer 620 may operate in a networked environment using logical connections to one or more remote computers or servers, such as remote computer 649. These logical connections are achieved by a communication device coupled to or a part of the computer 620; the invention is not limited to a particular type of communications device. The remote computer 649 can be another computer, a server, a router, a network PC, a client, a peer device or other common network node, and typically includes many or all of the elements described above I/O relative to the computer 620, although only a memory storage device 650 has been illustrated. The logical connections depicted in FIG. 6 include a local area network (LAN) 651 and/or a wide area network (WAN) 652. Such networking environments are commonplace in office networks, enterprise-wide computer networks, intranets and the internet, which are all types of networks.

When used in a LAN-networking environment, the computer 620 is connected to the LAN 651 through a network interface or adapter 653, which is one type of communications device. In some embodiments, when used in a WAN-networking environment, the computer 620 typically includes a modem 654 (another type of communications device) or any other type of communications device, e.g., a wireless transceiver, for establishing communications over the wide area network 652, such as the internet. The modem 654, which may be internal or external, is connected to the system bus 623 via the serial port interface 646. In a networked environment, program modules depicted relative to the computer 620 can be stored in the remote memory storage device 650 of remote computer, or server 649. It is appreciated that the network connections shown are exemplary and other means of, and communications devices for, establishing a communications link between the computers may be used including hybrid fiber-coax connections, T1-T3 lines, DSL's, OC-3 and/or OC-12, TCP/IP, microwave, wireless application protocol, and any other electronic media through any suitable switches, routers, outlets and power lines, as the same are known and understood by one of ordinary skill in the art.

EXAMPLES

1. A method comprising:
detecting an identifier of an object requested to run on a computer system via a kernel running on the computer system;
comparing the identifier with a list of identifiers of custom created code objects; and
taking an action as a function of whether or not the identifier of the requested object is on the list of identifiers of custom created code objects.

2. The method of example 1 wherein the list of identifiers includes a last time the requested object was executed via the kernel.

3. The method of example 2 wherein taking action comprises running the requested object if the list indicates that the object has been executed within a selected time frame.

4. The method of example 2 or 3 wherein taking action comprises not running the requested object if the list indicates that the object has not been executed for a selected time.

5. The method of example 2 or 3 wherein taking action comprises providing a communication indicating that it was requested that the object be executed.

6. The method of any of examples 1-5 and further comprising searching the list of for objects not executed within a selected time period and deleting such objects.

7. The method of example 6 wherein the time period is at least one year.

8. The method of example 6 wherein the time period is at least one quarter.

9. The method of example 6 wherein an object is backed up prior to being deleted.

10. A computer readable storage device having instructions to cause a computer to perform a method, the method comprising:
   detecting an identifier of an object requested to run on a computer system via a kernel running on the computer system;
   comparing the identifier with a list of identifiers of custom created code objects; and
   taking an action as a function of whether or not the identifier of the requested object is on the list of identifiers of custom created code objects.

11. The computer readable storage device of example 10 wherein the list of identifiers includes a last time the requested object was executed via the kernel.

12. The computer readable storage device of example 11 wherein taking action comprises running the requested object if the list indicates that the object has been executed within a selected time frame.

13. The computer readable storage device of example 11 or 12 wherein taking action comprises not running the requested object if the list indicates that the object has not been executed for a selected time.

14. The computer readable storage device of example 11 or 12 wherein taking action comprises providing a communication indicating that it was requested that the object be executed.

15. The computer readable storage device of any of examples 10-14 and further comprising searching the list of for objects not executed within a selected time period and deleting such objects.

16. The computer readable storage device of example 15 wherein the time period is at least one year.

17. The computer readable storage device of example 15 wherein the time period is at least one quarter.

18. The computer readable storage device of example 15 wherein an object is backed up prior to being deleted.

19. A system comprising:
   a module to detect an identifier of an object requested run on a computer system via a kernel running on the computer system;
   a module to compare the identifier with a list of identifiers of custom created code objects; and
   a module to take an action as a function of whether or not the identifier of the requested object is on the list of identifiers of custom created code objects.

20. The system of example 19 wherein the list of identifiers includes a last time the requested object was executed via the kernel, wherein taking action comprises running the requested object if the list indicates that the object has been executed within a selected time frame, and wherein taking action comprises not running the requested object if the list indicates that the object has not been executed for a selected time.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A method comprising:
   detecting an identifier of custom created object requested to run on a computer system via a kernel running on the computer system based on a name space of the object, wherein the object uses an interface to a software application to accomplish a specialized function not provided by the software application;
   comparing the identifier with a list of identifiers of custom created code objects;
   taking an action as a function of whether or not the identifier of the requested object is on the list of identifiers of custom created code objects;
   wherein the list of identifiers includes a last time the requested object was executed via the kernel; and
   wherein taking action comprises running the requested object if the list indicates that the object has been executed within a selected time frame and not running the requested object if the list of identifiers indicates that the object has not been executed within the selected time frame.

2. The method of claim 1, wherein taking action comprises decommissioning the object if the list of custom created code objects indicates that the object has not been executed within the selected time frame.

3. The method of claim 1, wherein taking action comprises providing a communication to a user or operator of the computer system indicating that it was requested that the object be executed.

4. The method of claim 1, and further comprising searching the list of identifiers of custom created code objects for objects not executed within a selected time period and deleting such objects.

5. The method of claim 4, wherein the time period is at least one year.

6. The method of claim 4, wherein the time period is at least one quarter.

7. The method of claim 4, wherein an object of the objects is backed up prior to being deleted.

8. A non-transitory computer readable storage device having instructions to cause a computer to perform a method, the method comprising:
   detecting an identifier of custom created object requested to run on a computer system via a kernel running on the computer system based on a name space of the object, wherein the object uses an interface to a software application to accomplish a specialized function not provided by the software application;
   comparing the identifier with a list of identifiers of custom created code objects;

taking an action as a function of whether or not the identifier of the requested object is on the list of identifiers of custom created code objects;

wherein the list of identifiers includes a last time the requested object was executed via the kernel; and wherein taking action comprises running the requested object if the list indicates that the requested object has been executed within a selected time frame and not running the requested object if the list of identifiers indicates that the object has not been executed within the selected time frame.

9. The computer readable storage device of claim 8, wherein taking action comprises providing a communication indicating that it was requested that the requested object be executed.

10. The computer readable storage device of claim 8, and further comprising searching the list of identifiers for objects not executed within a selected time period and deleting such objects.

11. The computer readable storage device of claim 10, wherein the time period is at least one year.

12. The computer readable storage device of claim 10, wherein the time period is at least one quarter.

13. The computer readable storage device of claim 10, wherein an object of the objects is backed up prior to being deleted.

14. A system comprising:

a processor;

a module on a computer readable storage device to cause the processor to detect an identifier of an object requested to run on a computer system via a kernel running on the computer system, wherein the object uses an interface to a software application to accomplish a specialized function not provided by the software application;

a module on the computer readable storage device to cause the processor to compare the identifier with a list of identifiers of custom created code objects;

a module on the computer readable storage device to cause the processor to take an action as a function of whether or not the identifier of the requested object is on the list of identifiers of custom created code objects;

wherein the list of identifiers includes a last time the requested object was executed via the kernel; and wherein taking action comprises running the requested object if the list indicates that the object has been executed within a selected time frame and not running the requested object if the list of identifiers indicates that the object has not been executed within the selected time frame.

* * * * *